3,104,246
PROCESS OF PREPARATION OF β-METHASONE
Gaston Amiard, Noisy-le-Sec, Vesperto Torelli, Maisons-Alfort, and Jean Cérède, Dugny, France, assignors to Roussel-UCLAF, S.A., Paris, France, a corporation of France
No Drawing. Filed July 26, 1962, Ser. No. 212,739
Claims priority, application France Aug. 18, 1961
14 Claims. (Cl. 260—397.45)

This invention relates to an improved process for the preparation of β-methasone or 21-acetoxy-16β-methyl-9α-fluoro-$\Delta^{1,4}$-pregnadiene-11β,17α-diol-3,20-dione and to the novel intermediates produced in this process.

The importance which the 16-methyl steroids, and particularly dexamethasone and its isomer in the 16-position, β-methasone, have recently taken is well known. But, whereas very many improved processes have been proposed for the preparation of dexamethasone, the existing processes giving access to the 16β isomer are much less satisfactory, especially those concerning the steps of the introduction of the methyl group in the 16β position and the hydroxyl group in the 17α position.

In the known processes of producing β-methasone, generally, one passes through the intermediary of the 16,17-pyrazolino derivative. This requires multiple steps which naturally implies an inevitable loss of yield at each step. Another inconvenience of these processes is the necessity of using a reactant which is dangerous to handle, which is the case with diazomethane, an indispensable product for the preparation of the pyrazoline ring.

It is known in addition that Italian chemists have finally realized the introduction of the methyl group in the 16β position in a steroid of the progesterone series by causing an organomagnesium compound to react on the 16,17-epoxy derivative (see Sciaky, Gaz. Ch. Ital. 91, 562–70, 1961). However, this process would not be thought of practical interest for the synthesis under discussion since steroids of the progesterone series are not substituted in the 11-position and such a reaction would affect the 11 substituent. In addition, the yields obtained by the cited authors were of the order of only 60%.

An object of the present invention is the development of a process for the obtention of 21-acetoxy-16β-methyl-$\Delta^{1,4,9(11)}$-pregnatriene-17α-ol-3,20-dione, an intermediate useful in the production of β-methasone from 3α-acyloxy-16α,17α-oxido-5β-pregnane-11,20-dione.

Another object of the present invention is the development of a process for the introduction of a methyl group in the 16β position in a steroid of the pregnane series containing an activating function in the 11 position.

A still further object of the invention is the obtention of the novel intermediates:

(a) 3α-acyloxy - 16α,17α - oxido-20,20-ethylenedioxy-5β-pregnane-11-one, III, wherein acyl represents the acyl radical of an organic carboxylic acid having from one to eighteen carbon atoms, particularly acetoxy;

(b) 16α,17α - oxido-20,20-ethylenedioxy-5β-pregnane-3α,11β-diol, IV;

(c) 3α-acyloxy - 16α,17α - oxido-20,20-ethylenedioxy-5β-pregnane-11β-ol, V, wherein acyl represents the acyl radical of an organic carboxylic acid having from one to eighteen carbon atoms, particularly acetoxy;

(d) 3α-acyloxy - 16α,17α - oxido-20,20-ethylenedioxy-$\Delta^{9(11)}$-5β-pregnene, VI, wherein acyl represents the acyl radical of an organic carboxylic acid having from one to eighteen carbon atoms, particularly acetoxy;

(e) 16β-methyl - $\Delta^{9(11)}$ - 5β - pregnene-3α,17α-diol-20-one, VII;

(f) 16β - methyl-$\Delta^{9(11)}$-5β-pregnene-17α-ol-3,20-dione, VIII;

(g) 2β,4β - dibromo - 16β - methyl-$\Delta^{9(11)}$-5β-pregnene-17α-ol-3,20-dione, VIII';

(h) 16β - methyl - $\Delta^{1,4,9(11)}$ - pregnatriene-17α-ol-3,20-dione, IX;

(i) 21-diiodo - 16β - methyl-$\Delta^{1,4,9(11)}$-pregnatriene-17α-ol-3,20-dione, IX'.

These and other objects of the invention will become more apparent as the description thereof proceeds.

In the process of the invention 3α-acetoxy-16α,17α-oxido-5β-pregnane-11,20-dione, described by Julian et al. (J. Am. Chem. Soc. 77, 4601, 1955) is utilized as the starting material, although esters with other organic carboxylic acids having from one to eighteen carbon atoms on the 3α-ol position may be employed. After producing a double bond in the 9,11-position and blocking the functions in the 3- and 20-positions, the existence of the oxydic bridge in the 16,17-position is taken advantage of in order to introduce, by a Grignard reaction in one single operation, the methyl group in the 16β position and the hydroxyl group in the 17α position.

16β-methyl-$\Delta^{9(11)}$-5β-pregnene - 3α,17α - diol-20-one is thus obtained. This compound is next transformed easily into 21-acetoxy-16β-methyl-$\Delta^{1,4,9(11)}$-pregnatriene-17α-ol-3,20-dione, I. The method of producing β-methasone from this latter compound is known.

The new process gives elevated yields and presents other advantages which will be apparent to the specialists in the art.

The process, object of the invention, is found resumed by the flow diagram of Table I.

TABLE I

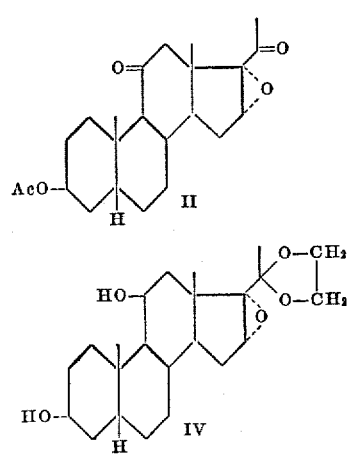

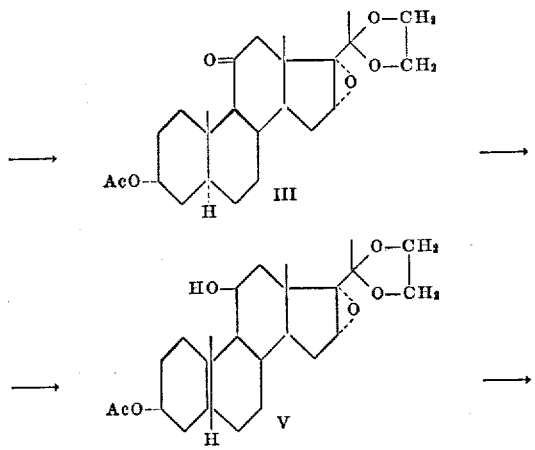

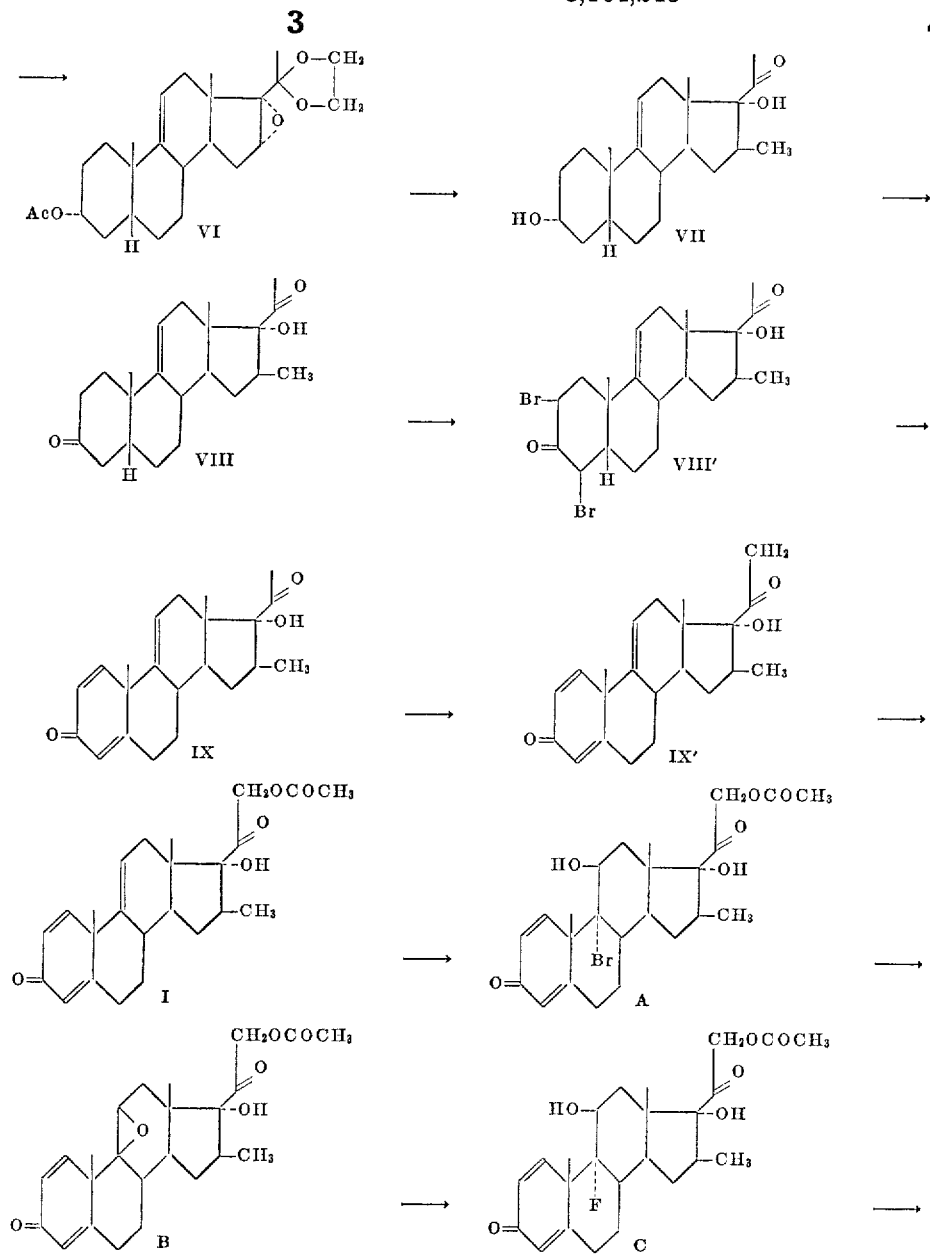

Ac represents the acyl radical of an organic carboxylic acid having from one to eighteen carbon atoms.

The said process consists essentially in the following steps: (A) The 20-ethyleneketal of 3α-acetoxy-16α,17α-oxido-5β-pregnane-11,20-dione, II, is formed by a selective reaction of the 11,20-dione in the 20 position only with ethylene glycol or a derivative such as methyl ethyl dioxolane in the presence of an inert organic solvent. (B) The 3α-acetoxy-16α,17α-oxido-20,20-ethylenedioxy-5β-pregnane-11-one, III, is reduced with simultaneous saponification by an alkali metal borohydride in an inert organic solvent. (C) The 16α,17α-oxido-20,20-ethylenedioxy-5β-pregnane-3α,11β-diol, IV, obtained is esterified with a derivative of an organic carboxylic acid having from one to eighteen carbon atoms on the alcohol function in the 3-position in order to protect the same; preferably the acetic anhydride is utilized. (D) The alcohol function in the 11-position of 3α-acyloxy-16α,17α-oxido-20,20-ethylenedioxy-5β-pregnane-11β-ol, V, is dehydrated with the aid of a hydrocarbon sulfonyl chloride. (E) The resulting 3α-acyloxy-16α,17α-oxido-20,20-ethylenedioxy-Δ9(11)-5β-pregnene, VI, is reacted with a methyl magnesium halide in an inert organic solvent. (F) The 16β-methyl-Δ9(11)-5β-pregnene-3α,17α-diol-20-one, VII, ob-tained is oxidized with the aid of an oxidizing agent such as chromium trioxide in order to convert the alcohol function in the 3-position into a ketone. (G) The dione obtained, VIII, is subjected to bromination, then dehydrobromination by the action of an alkaline agent on the 2,4-dibromo intermediate, VIII', formed. (H) The 16β-methyl-Δ1,4,9(11)-pregnatriene-17α-ol-3,20-dione, IX, obtained is subjected to iodination in the presence of calcium hydroxide and calcium chloride in an inert solvent. An alkali metal acetate is reacted with the diiodated product, IX', and 21-acetoxy-16β-methyl-Δ1,4,9(11)-pregnatriene-17α-ol-3,20-dione, I, is obtained. This product can be transformed by known methods into β-methasone, C.

In the esterification of Step C and in the starting ester, the esterifying acid may be any organic carboxylic acid having from one to eighteen carbon atoms, as indicated. However, it is preferable to employ lower alkanoic acids such as acetic acid as the esterifying acid.

Preferably, the execution of the process of the invention is conducted under the following conditions:

(a) In Step A, the 20-ethylene-ketal of 3α-acetoxy-16α,17α-oxido-5β-pregnane-11,20-dione, II, is formed by the action of ethylene glycol on the latter in the presence of p-toluene sulfonic acid as catalyst at the reflux temperature. Other esters in the 3 position may also be employed, if available, since the ester group is saponified in the next step.

(b) In Step B, the reduction and simultaneous saponification of 3α-acetoxy-16α,17α-oxido-20,20-ethylenedioxy-5β-pregnane-11-one, III, is effected by potassium borohydride in the presence of tetrahydrofuran at the reflux temperature. Presence of an amount of water is desirable.

(c) In Step C, the esterification of the alcohol function in the 3 position of 16α,17α-oxido-20,20-ethylenedioxy-5β-pregnane-3α,11β-diol, IV, is effected with acetic acid anhydride in pyridine at about room temperature.

(d) In Step D, the dehydration of the alcohol function in the 11 position of 3α-acetoxy-16α,17α-oxido-20,20-ethylenedioxy-5β-pregnane-11β-ol, V, is effected with the aid of methane sulfonyl chloride in the presence of dimethylformamide at about room temperature.

(e) In Step E, an excess of methyl magnesium halide in the order of 10 to 50 mols wtih reference to the amount of steroid compound being reacted upon is utilized.

(f) In Step E, the reaction with methyl magnesium halide is conducted at temperatures between about 75° and 100° C.

(g) In Step E, the methyl magnesium halide used is the bromide.

(h) In Step E, the reaction with methyl magnesium bromide is conducted in tetrahydrofuran.

(i) In Step F, the oxidation of the alcohol in the 3-position of 16β-methyl-$\Delta^{9(11)}$-5β-pregnene-3α,17α-diol-20-one, VII, is effected with chromium trioxide in the presence of sulfuric acid. An inert organic solvent such as acetone is employed and the reaction is conducted between about —5° C. and 15° C., preferably at 0° C.

(j) In Step G, the bromination of 16β-methyl-$\Delta^{9(11)}$-5β-pregnene-17α-ol-3,20-dione, VIII, is effected in acetic acid media. The presence of hydrobromic acid and water in small amounts is also preferable. The reaction is conducted at temperatures between about 5° C. and 30° C., preferably between 15° C. and 18° C.

(k) In Step G the dehydrobromination agent used is the mixture of lithium carbonate and lithium bromide in dimethylformamide. The reaction is conducted at temperatures between about 100° C. and 150° C., preferably at about 135° C.

(l) In Step H, potassium acetate is made to react on 21 - diiodo - 16β - methyl - $\Delta^{1,4,9(11)}$ - pregnatriene - 17α-ol-3,20-dione, IX', while operating in acetone in the presence of a small amount of acetic acid at reflux temperatures.

(m) The transformation of 2-acetoxy - 16β - methyl-$\Delta^{1,4,9(11)}$ - pregnatriene - 17α - ol - 3,20 - dione into β-methasone is effected by the method described by Taub et al. in J. Am. Chem. Soc. 82, pp. 4012–4026 (1960). A brief example of this process is indicated as Example II.

The following examples illustrate the invention without however limiting it. It is obvious that other changes and modifications known to those skilled in the art may be employed. The melting points are instantaneous melting points determined on the Kofler block.

EXAMPLE I

*Preparation of 21-Acetoxy-16β-Methyl-$\Delta^{1,4,9(11)}$-Pregnatriene-17α-Ol-3,20-Dione (Compound I)*

STEP A.—3α-ACETOXY-16α,17α-OXIDO-20,20-ETHYLENEDIOXY-5β-PREGNANE-11-ONE (COMPOUND III)

22 g. of 3α-acetoxy-16α,17α-oxido-5β-pregnane-11,20-dione, II, having a melting point of 133 and 152° C. and a specific rotation $[\alpha]_D^{20} = +114°$ (chloroform) (obtained according to Julian et al., J. Am. Chem. Soc. 77, 4601, 1955) were dissolved in 880 cc. of anhydrous benzene. The solution was heated to the boiling point, then 88 cc. of ethylene glycol and 880 mg. of p-toluene sulfonic acid were added. The reaction mixture was heated to reflux for a period of 15 hours. After cooling, the reaction mixture was poured into water saturated with sodium bicarbonate. This mixture was decanted and the aqueous phase was extracted with benzene. The combined organic phases were dried and several drops of pyridine were added thereto. The organic solution was evaporated to dryness under vacuum. The residue was crystallized from methanol containing 1% of pyridine. 22 g. (yield 90%) of 3α-acetoxy-16α,17α-oxido-20,20-ethylenedioxy-5β-pregnane-11-one, III, having a melting point of 129–130° C., and a specific rotation $[\alpha]_D^{20} = +91° \pm 1°$ (c.=1%) in chloroform) were obtained. The product occurred as white crystals and was soluble in alcohol, acetone and benzene.

*Analysis.*—$C_{25}H_{36}O_6$: molecular weight=432.54. Calculated: C, 69.41%; H, 8.38%. Found: C, 69.7%; H, 8.4%.

This compound is not described in the literature.

STEP B.—16α,17α-OXIDO-20,20-ETHYLENEDIOXY-5β-PREGNANE-3α,11β-DIOL (COMPOUND IV)

16.3 g. of 3α-acetoxy-16α,17α-oxido-20,20-ethylenedioxy-5β-pregnane-11-one, III, were dissolved in 200 cc. of tetrahydrofuran and 80 cc. of methanol. Then 8 g. of potassium borohydride and 40 cc. of water were added successively to the solution.

The reaction mixture was heated to reflux under agitation for a period of 3 hours. Next 320 cc. of water was added thereto and the organic solvents were distilled off under vacuum. 16α,17α-oxido-20,20-ethylenedioxy-5β- pregnane-3α,11β-diol, IV, crystallized. The product was vacuum filtered, washed with water, and dried. For purification, the product was recrystallized from a mixture of chloroform and isopropyl ether. 13.8 g. (yield 93%) of a product melting at 185° C. and having a specific rotation $[\alpha]_D^{20} = +54° \pm 1°$ (c.=1% in chloroform) were obtained. The product occurred as colorless prismatic crystals and was soluble in acetone, chloroform and alcohol, slightly soluble in ether and benzene, and insoluble in water.

*Analysis.*—$C_{23}H_{36}O_5$: molecular weight=392.52. Calculated: C, 70.37%; H, 9.24%; O, 20.38%. Found: C, 70.4%; H, 9.0%; O, 20.8.

This compound is not described in the literature.

STEP C.—3α-ACETOXY-16α,17α-OXIDO-20,20-ETHYLENEDIOXY-5β-PREGNANE-11β-OL (COMPOUND V)

40.72 g. of 16α,17α-oxido-20,20-ethylenedioxy-5β-pregnane-3α,11α-diol, IV, were dissolved in 80 cc. of pyridine. 40 cc. of acetic acid anhydride were added thereto and the reaction mixture was allowed to stand at room temperature for a period of 16 hours. The reaction mixture was next poured into iced water. The precipitated product was vacuum filtered and recrystallized from methanol containing 1% of pyridine. About 45 g. of 3α-acetoxy - 16α,17α - oxido - 20,20 - ethylenedioxy - 5β-pregnane-11β-ol, V, having a melting point of 157–158° C. and a specific rotation $[\alpha]_D^{20} = +69° \pm 1°$ (c.=1% in chloroform) were obtained. Yield: practically quantitative.

The product occurred as colorless crystals of hexagonal form and was soluble in acetone, benzene and chloroform, slightly soluble in alcohol and ether, and insoluble in water.

*Analysis.*—$C_{25}H_{38}O_6$: molecular weight=434.55. Calculated: C, 69.09%; H, 8.81%. Found: C, 69.1%; H, 8.8.

This compound is not described in the literature.

STEP D.—3α-ACETOXY-16α,17α-OXIDO-20,20-ETHYLENEDIOXY-$\Delta^{9(11)}$-5β-PREGNENE (COMPOUND VI)

40.5 g. of 3α-acetoxy-16α,17α-oxido-20,20-ethylenedioxy-5β-pregnane-11β-ol, V, were dissolved in 200 cc. of dimethylformamide. 50 cc. of anhydrous pyridine, then 20 cc. of methane sulfonyl chloride were added thereto. The reaction mixture was allowed to stand at room temperature for a period of four hours. Next it was poured into water. The precipitated product was vacuum filtered, washed with water, and recrystallized from methanol containing 1% of pyridine. 37.3 g., being a yield of 96%, of 3α-acetoxy-16α,17α-oxido - 20,20 - ethylenedioxy - $\Delta^{9(11)}$ - 5β - pregnene, VI, were obtained in a practically pure state, having a melting point of 133° C. and a specific rotation $[\alpha]_D^{20} = +79° \pm 1°$ (c.=1% in chloroform). For analysis, the product was recrystallized a second time from methanol containing 1% of pyridine, and a sample was obtained melting at 134° C. The yield of recrystallization: 98%.

This compound is not described in the literature.

The product occurred in the form of colorless prismatic crystals and was soluble in acetone, benzene and chloroform, less soluble in ether and alcohol, and insoluble in water. This compound is not described in the literature.

STEP E.—16β-METHYL-$\Delta^{9(11)}$-5β-PREGNENE-3α,17α-DIOL-20-ONE (COMPOUND VII)

(a) *Preparation of the magnesium Grignard reagent.*—100 g. of magnesium turnings were introduced into 2 liters of anhydrous tetrahydrofuran. The reaction mixture was agitated and anhydrous methyl bromide was made to bubble therethrough for a period of 2 to 3 hours while maintaining the temperature between 20 to 30° C. After complete disappearance of the magnesium, the solution obtained was allowed to stand at room temperature overnight. The next day, 50 to 100 cc. of tetrahydrofuran were distilled therefrom. A solution of magnesium Grignard reagent testing 1.5 to 1.6 mols per liter was obtained.

(b) *Grignard reaction.*—10 g. of 3α-acetoxy-16α,17α-oxido-20,20-ethylenedioxy-$\Delta^{9(11)}$-5β-pregnene, VI, were dissolved in 100 cc. of anhydrous tetrahydrofuran. This solution was introduced into 640 cc. of the solution of methyl magnesium bromide prepared above under an atmosphere of nitrogen. The reaction mixture was distilled at ordinary pressure in order to remove about half of the solvent and until the temperature of the reaction mixture attained 89° C. The heating was then continued at reflux for a period of 15 hours. Thereafter, the reaction mixture was cooled to 40° C. 250 cc. of tetrahydrofuran and 250 cc. of ether were added and the mixture was poured onto a mixture of water and ice containing 10% of concentrated hydrochloric acid. This mixture was decanted and the aqueous phase was extracted with ether. The combined organic phases, including the ethereal extracts, were washed with water, dried, and evaporated to dryness under vacuum. The residue was dissolved in 75 cc. of acetic acid, 25 cc. of water was added thereto, and the mixture was heated to the vaporization point for a period of half an hour. Thereafter, the mixture was evaporated to dryness under vacuum. A crystallized residue was obtained which was washed with a solution of sodium bicarbonate and with water. This residue was dried and recrystallized from isopropyl ether. 8.15 g., being a yield of 98%, of 16β-methyl-$\Delta^{9(11)}$-5β-pregnene-3α,17α-diol-20-one, VII, were obtained, having a melting point of 174° C. and a specific rotation $[\alpha]_D^{20} = +31° \pm 1°$ (c.=1% in chloroform). The product occurred in the form of colorless rectangular leaflets, and was soluble in alcohol, benzene and chloroform, slightly soluble in ether and acetone, and insoluble in water.

*Analysis.*—$C_{22}H_{34}O_3$: molecular weight=346.49. Calculated: C, 76.26%; H, 9.89%. Found: C, 76.1%; H, 9.8%.

This compound is not described in the literature.

STEP F.—16β-METHYL-$\Delta^{9(11)}$-5β-PREGNENE-17α-OL-3,20-DIONE (COMPOUND VIII)

6.43 g. of 16β-methyl-$\Delta^{9(11)}$-5β-pregnene-3α,17α-diol-20-one, VII, were dissolved in 190 cc. of acetone. The solution was cooled to 0° C. and 4.5 cc. of a solution of 20% sulfuric acid containing 0.27 g. of chromium trioxide per cc. was added very slowly. The reaction mixture was agitated at a temperature of 0° C. for a period of ten minutes, then extracted with ether. The ethereal extracts were combined, washed with water, dried and evaporated to dryness under vacuum. The residue was recrystallized from isopropyl ether and furnished 5.6 g., a yield of 87%, of 16β-methyl-$\Delta^{9(11)}$-5β-pregnene-17α-ol-3,20-dione, VIII, having a melting point of 182–183° C. and a specific rotation $[\alpha]_D^{20} = +23°$ (c.=1% in chloroform). The product occurred as colorless prismatic crystals, and was soluble in benzene and chloroform, slightly soluble in alcohol, ether and acetone, and insoluble in water.

*Analysis.*—$C_{22}H_{32}O_3$: molecular weight=344.48. Calculated: C, 76.70%; H, 9.36%. Found: C, 76.7%; H, 9.2%.

This product is not described in the literature.

STEP G.—16β-METHYL-$\Delta^{1,4,9(11)}$-PREGNATRIENE-17α-OL-3,20-DIONE (COMPOUND IX)

10 g. of 16β-methyl-$\Delta^{9(11)}$-5β-pregnene-17α-ol-3,20-dione, VIII, was introduced into 100 cc. of ethyl acetate containing 0.5% of water. Several drops of hydrobromic acid in solution in acetic acid were added to the suspension. Then 100 cc. of a solution of 10 g. of bromine in acetic acid containing 0.5 cc. of water were introduced very slowly. The reaction mixture was agitated at a temperature of 15 to 18° C. for a period of a quarter of an hour. Next a mixture of water and ice was added. 2β,4β-dibromo-16β-methyl-$\Delta^{9(11)}$-5β-pregnene-17α-ol-3,20-dione crystallized. The crystals were vacuum filtered, and washed with water. The moist product was triturated with 45 cc. of isopropyl ether, vacuum filtered, washed two times with 15 cc. of isopropyl ether, and dried at 40° C. 12.5 g. of the raw dibrominated derivative was obtained. In order to obtain the pure product, the raw product was triturated first with 40 cc. of ethyl acetate, then, after vacuum filtering, with 25 cc. of methanol. The purified product was vacuum filtered and dried at 60° C. 11.7 g. (yield 80%) of pure 2β,4β-dibromo-16β-methyl-$\Delta^{9(11)}$-5β-pregnene-17α-ol-3,20-dione, VIII', was obtained, having a melting point of 260° C. (with decomposition) and a specific rotation $[\alpha]_D^{20} = +20° \pm 1°$ (c.=1% in chloroform).

The dibrominated derivative, VIII', was a colorless crystallized product. It was insoluble in water, very slightly soluble in acetone, benzene, chloroform, ethanol and ether.

*Analysis.*—$C_{22}H_{30}O_3Br_2$: molecular weight=502.30. Calculated: C, 52.6%; H, 6.02%; Br, 31.82%. Found: C, 52.7%; H, 6.1%; Br, 31.7%.

This compound is not described in the literature.

10 g. of lithium bromide and 20 g. of lithium carbonate were added while agitating to 100 cc. of dimethyl formamide. The mixture was heated to 134–136° C. and very rapidly 10 g. of pure 2β,4β-dibromo-16β-methyl-$\Delta^{9(11)}$-5β-pregnene-17α-ol-3,20-dione were introduced. The temperature was maintained at 134–136° C. for a period of two hours under an atmosphere of nitrogen and while agitating. Next the reaction mixture was cooled to 60° C. and poured into a mixture of water and ice containing a small amount of acetic acid. The precipitate was vacuum filtered and washed with water. The moist product was added to 50 cc. of water and heated to 95–99° C. while agitating for a period of one hour. Thereafter, it was vacuum filtered and dried at 60° C. The raw product was triturated with 20 cc. of isopropyl ether. It was vacuum filtered, washed two times with 6 cc. of isopropyl ether and dried at 60° C. 6.2 g. (yield 90% with reference to compound VIII') of pure 16β-methyl-$\Delta^{1,4,9(11)}$-pregnatriene-17α-ol-3,20-dione, IX, was obtained, having a melting point of 170° C. and a specific rotation $[\alpha]_D^{20} = +40° \pm 2°$ (c.=1% in ethanol).

Compound IX occurred in crystallized form and was soluble in benzene and chloroform, slightly soluble in ether and insoluble in water.

U.V. spectra (in ethanol): λ max. at 239–240 mμ, ε=15,000.

*Analysis.*—$C_{22}H_{28}O$.: molecular weight =340.4. Calculated: C, 77.61%; H, 8.28%. Found: C, 77.7%; H, 8.4%.

This compound is not described in the literature.

STEP H.—21-ACETOXY-16β-METHYL-$\Delta^{1,4,9(11)}$-PREGNATRIENE-17α-OL-3,20-DIONE (COMPOUND I)

10 g. of 16β-methyl-$\Delta^{1,4,9(11)}$-pregnatriene-17α-ol-3,20-dione, IX, were introduced into a mixture of 40 cc. of absolute methanol and 10 cc. of a methanolic solution containing 10% of calcium chloride. To the suspension formed, 6.5 g. of calcium hydroxide were added. The suspension was agitated under an atmosphere of nitrogen for several minutes at room temperature. Then the interior temperature was raised to 40° C. Next, in the absence of light, under an atmosphere of nitrogen and while agitating, 55 cc. of a methanolic solution containing 26.6 g. of iodine and 10 g. of calcium chloride per 100 cc. was introduced slowly and while maintaining a temperature of 38–42° C. Then 22 cc. of aboslute methanol was introduced under the same conditions. The total addition was effected in the space of about half an hour. After the introduction of the reactants, the temperature was maintained for another half hour at 38–42° C. under agitation and under an atmosphere of nitrogen. The temperature was thereafter brought to 20° C. and the mixture was poured, while agitating, into a mixture of water and ice containing 4% of acetic acid. This mixture was agitated for a period of half an hour. The precipitate was vacuum filtered, washed with water and dried under vacuum. Raw Compound IX' was separated and purified by trituration with acetone. 15.4 g. (yield 88.5%) of 21-diiodo-16β-methyl-$\Delta^{1,4,9(11)}$-pregnatriene-17α-ol-3,20-dione, IX', was obtained, having a melting point of 250° C. (with decomposition).

This compound is not described in the literature.

15.4 g. of the diiodated derivative, IX', and 45 cc. of dimethylformamide were introduced into a mixture of 150 cc. of acetone containing 1% of water, 1.5 cc. of acetic acid and 15.4 g. of potassium acetate. This mixture was heated to reflux in an atmosphere of nitrogen under agitation and in the absence of light for a period of an hour and a half. Next, the mixture was cooled to 20° C. and 50 cc. of water was added thereto. The mixture was allowed to stand at rest until the potassium salt dissolved. More water was added and the mixture was cooled. The precipitate was vacuum filtered, washed with water and dried at 80° C. 10 g. (being a yield of 85% with reference to Compound IX) of 21-acetoxy-16β-methyl-$\Delta^{1,4,9(11)}$-pregnatriene-17α-ol-3,20-dione, I, were obtained, having a melting point of 210–212° C., and identical to the compound described by Taub et al., J. Am. Chem. Soc. 82, 4012–26 (1960).

EXAMPLE II

*Preparation of β-Methasone*

STEP I.—9α-BROMO-21-ACETOXY-16β-METHYL-$\Delta^{1,4}$-PREGNADIENE-11β,17α-DIOL-3,20-DIONE (COMPOUND A)

Starting from Compound I, Compound A was obtained having a melting point of 140–142° C. (with decomposition) according to the method of operation described by Taub et al.

STEP II.—9β,11β-OXIDO-21-ACETOXY-16β-METHYL-$\Delta^{1,4}$-PREGNADIENE-17α-OL-3,20-DIONE (COMPOUND B)

Starting from Compound A, Compound B was obtained having a melting point of 225–228° C. according to the method of operation described by Taub et al.

STEP III.—β-METHASONE (COMPOUND C)

Starting from Compound B, β-methasone (Compound C) was obtained, having a melting point of 205–208° C., according to the method of operation described by Taub et al.

It will be understood that the invention is not limited to the specific modes of execution described above. Particularly, it is evident to one skilled in the art that equivalent techniques, such as the use of other organic carboxylic acids having from one to eighteen carbon atoms, other solvents, other temperatures, etc., may be employed without departing from the spirit of the invention or the scope of the appended claims.

We claim:

1. A process for the preparation of 21-acetoxy-16β-methyl-$\Delta^{1,4,9(11)}$-pregnatriene-17α-ol-3,20-dione which comprises the steps of (A) reacting 3α-acyloxy-16α,17α-oxido-5β-pregnane-11,20-dione wherein acyl represents the acyl radical of an organic carboxylic acid having from one to eighteen carbon atoms with an ethylene ketal-producing compound under ketalizing conditions, (B) reacting the 3α-acyloxy-16α,17α-oxido-20,20-ethylenedioxy-5β-pregnane-11-one with an alkali metal borohydride in an inert aqueous organic solvent, (C) esterifying the alcohol in the 3-position of 16α,17α-oxido-20,20-ethylenedioxy-5β-pregnane-3α,11β-diol by the action of a functional derivative of an organic carboxylic acid having from one to eighteen carbon atoms, (D) subjecting the 3α-acyloxy-16α,17α-oxido-20,20-ethylenedioxy-5β-pregnane-11β-ol wherein acyl has the above-assigned meaning to the action of a hydrocarbon sulfonyl chloride, (E) reacting the 3α-acyloxy-16α,17α-oxido-20,20-ethylenedioxy-$\Delta^{9(11)}$-5β-pregnene where acyl has the above-assigned meaning with a methyl magnesium halide in the presence of an inert organic solvent, (F) oxidizing the alcohol in the 3 position of 16β-methyl-$\Delta^{9(11)}$-5β-pregnene-3α,17α-diol-20-one by the action of an acidic oxidizing agent, (G) subjecting the 16β-methyl-$\Delta^{9(11)}$-5β-pregnene-17α-ol-3,20-dione to the action of bromine under brominating conditions, (H) dehydrobrominating the 2β,4β-dibromo-16β-methyl-$\Delta^{9(11)}$-5β-pregnene-17α-ol-3,20-dione by the action of an alkaline agent at elevated temperatures, (I) subjecting the 16β-methyl-$\Delta^{1,4,9(11)}$-pregnatriene-17α-ol-3,20-dione to the action of iodine in the presence of calcium hydroxide and calcium chloride, (J) reacting the 21-diiodo-16β-methyl-$\Delta^{1,4,9(11)}$-pregnatriene-17α-ol-3,20-dione with an alkali metal acetate in an inert organic solvent, and (K) recovering said 21-acetoxy-16β-methyl-$\Delta^{1,4,9(11)}$-pregnatriene-17α-ol-3,20-dione.

2. The process of claim 1, step (A), wherein said ethylene ketal-producing compound is ethylene glycol in the presence of p-toluene sulfonic acid as a catalyst and said acyloxy is the acetoxy.

3. The process of claim 1, step (B), wherein said alkali metal borohydride is potassium borohydride in tetrahydrofuran and said acyloxy is the acetoxy.

4. The process of claim 1, step (C), wherein said esterifying of the alcohol function in the 3 position of 16α,17α-oxido,20,20-ethylenedioxy-5β-pregnane-3α,11β-diol is effected by acetic acid anhydride in pyridine.

5. The process of claim 1, step (D), wherein said hydrocarbon sulfonyl chloride is methane sulfonyl chloride and said acyloxy is acetoxy.

6. The process of claim 1, step (E), wherein an excess of said methyl magnesium halide of the order of 10 to 50 mols with reference to the amount of said pregnene compound is utilized and said acyloxy is acetoxy.

7. The process of claim 1, step (E), wherein said reaction with magnesium methyl halide is conducted at temperatures situated between about 75° C. and 100° C.

8. The process of claim 1, step (E), wherein said methyl magnesium halide used is the bromide.

9. The process of claim 8, wherein said reaction with methyl magnesium bromide is conducted in the presence of tetrahydrofuran.

10. The process of claim 1, step (F), wherein said ketone-producing oxidizing agent is chromium trioxide in the presence of sulfuric acid.

11. The process of claim 1, step (G), wherein the bromination of said dione is effected in an acetic acid medium.

12. The process of claim 1, step (H), wherein said alkaline agent is the mixed lithium carbonate-lithium bromide salt in dimethylformamide.

13. The process of claim 1, step (J), wherein said alkali metal acetate is potassium acetate in acetone.

14. The process of producing 16β-methyl-$\Delta^{9(11)}$-5β-pregnene-3α,17α-diol-20-one which comprises the step of reacting 3α-acyloxy-16α,17α-oxido-20,20-ethylenedioxy-$\Delta^{9(11)}$-5β-pregnene where acyl represents the acyl radical of an organic carboxylic acid having from one to eighteen carbon atoms with an excess of a methyl magnesium halide in an inert anhydrous organic solvent at temperatures from room temperature to the reflux temperature and recovering said 16β-methyl-$\Delta^{9(11)}$-5β-pregnene-3α,17α-diol-20-one.

References Cited in the file of this patent
UNITED STATES PATENTS

| | | |
|---|---|---|
| 2,945,029 | Nomine | July 12, 1960 |
| 2,970,155 | Joly et al. | Jan. 31, 1961 |
| 2,980,713 | Chemerda et al. | Apr. 18, 1961 |
| 3,007,949 | Nomine et al. | Nov. 7, 1961 |
| 3,062,848 | Joly et al. | Nov. 6, 1962 |
| 3,067,195 | Cutler et al. | Dec. 4, 1962 |

UNITED STATES PATENT OFFICE
CERTIFICATE OF CORRECTION

Patent No. 3,104,246            September 17, 1963

Gaston Amiard et al.

It is hereby certified that error appears in the above numbered patent requiring correction and that the said Letters Patent should read as corrected below.

Column 5, line 51, for "2-acetoxy-" read -- 21-acetoxy- --; column 6, line 48, for "11α-diol" read -- 11β-diol --; column 9, line 5, for "$C_{22}H_{28}O$." read -- $C_{22}H_{28}O_3$ --; line 24, for "aboslute" read -- absolute --.

Signed and sealed this 25th day of February 1964.

(SEAL)
Attest:
ERNEST W. SWIDER

Attesting Officer

EDWIN L. REYNOLDS

Acting Commissioner of Patents